Sept. 3, 1940.  J. A. COLE  2,213,624
TRAP HOOK
Filed April 5, 1939
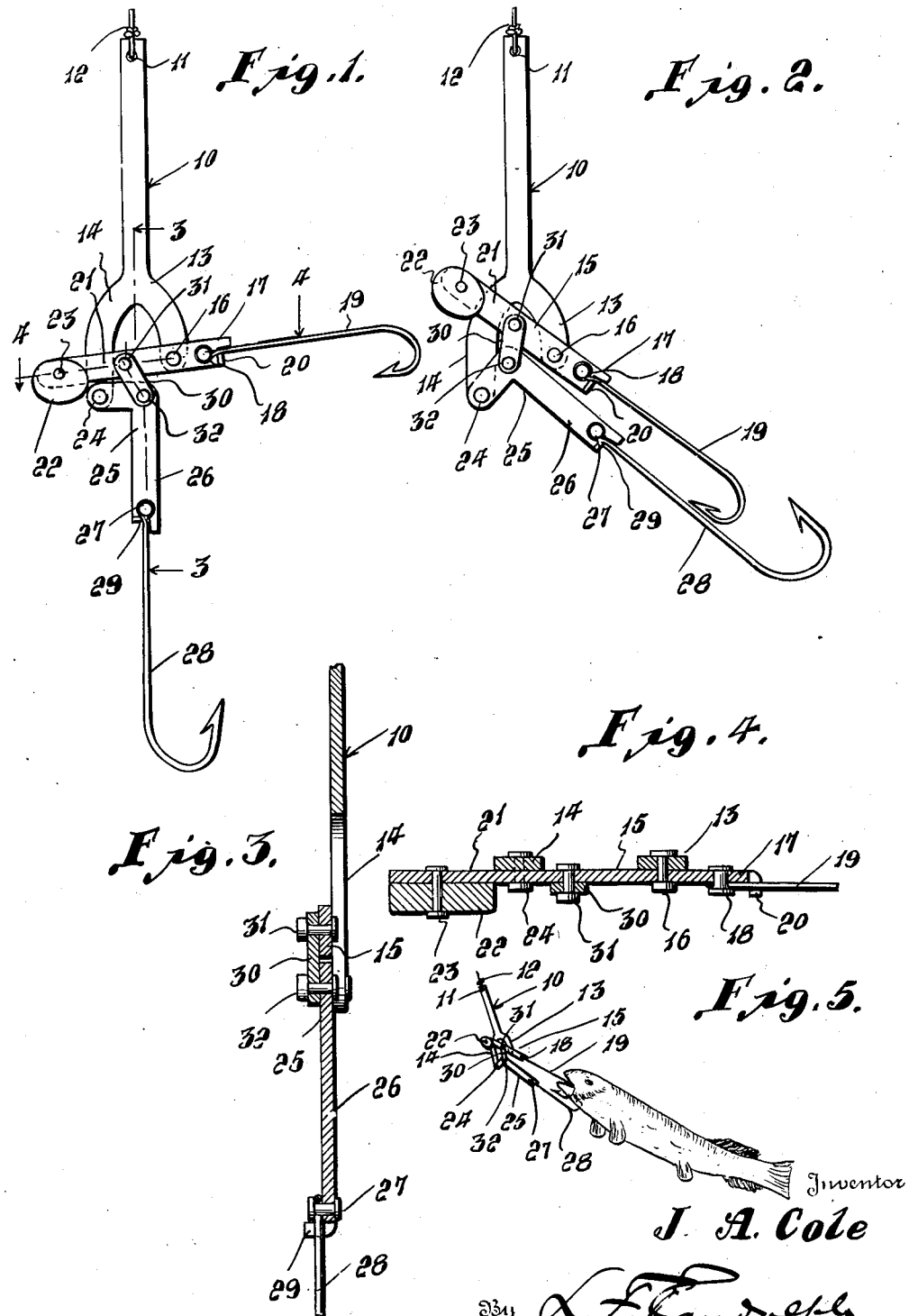

Patented Sept. 3, 1940

2,213,624

UNITED STATES PATENT OFFICE 2,213,624

TRAP HOOK

Julius A. Cole, Camden, Tenn.

Application April 5, 1939, Serial No. 266,204

7 Claims. (Cl. 43—37)

This invention relates to an improved automatic self-setting trap hook.

It is a primary aim of this invention to provide an improved trap hook for use in hand line or rod and reel fishing and including a pair of hooks connected by link and lever means whereby a pull on one of the hooks will actuate the other hook to cause the last mentioned hook to swing upwardly to gaff the fish caught by the first mentioned hook.

More particularly, it is aim of this invention to provide a supporting member adapted to be connected at one end to a fishing line, the opposite end of said member being bifurcated to pivotally support a pair of levers connected by means of a link and having hooks extending from corresponding ends thereof for trapping fish caught on one of the hooks.

Other objects and advantages of the invention will hereinafter become more fully apparent from the following description of the drawing, which illustrates a preferred embodiment thereof, and wherein:

Figure 1 is a front elevational view showing the trap hook in its normal set position, Figure 2 is a corresponding view showing the trap hook in a closed position, Figure 3 is a longitudinal vertical sectional view taken along the line 3—3 of Figure 1, Figure 4 is a horizontal sectional view taken along the line 4—4 of Figure 1, and Figure 5 is a diagrammatic view showing a fish caught by the hook.

Referring more particularly to the drawing, wherein like reference characters designate like or corresponding parts throughout the different views, 10 designates generally the supporting member of the trap hook having an opening 11 at one end thereof by means of which the member 10 is adapted to be connected to a fishing line 12. The opposite depending end of the supporting member 10 is bifurcated to form the legs 13 and 14.

A lever 15 is connected adjacent one of its ends by means of the pivot pin 16 to the end of the leg 13. The end 17 of the lever 15, which is adjacent to the pivot point 16 provided with a fastening 18 by means of which a fish hook 19 is connected to the end of the lever 17 to project therefrom. End 17 may be split and bent as indicated at 20, to engage the shank of the hook 19 to prevent it from turning on the fastening 18 to retain it in extended position relatively to the lever 15. The opposite end 21 of the lever 15 extends across the leg 14 and is provided with a weighted element 22 secured thereto by means of the fastening 23.

Leg 14 is longer than the leg 13 and is provided at its free end with the pivot pin 24 which is loosely connected to one end of a lever 25 which is angular in shape. The free end 26 of the lever 25, which is disposed substantially at right angles to the pivotally connected end thereof is provided with a fastening 27 to which is connected the shank end of a hook 28 which extends therefrom and which is held in extended position by the split flanged end 29, which corresponds to the portion 20 of lever 15.

A link 30 is pivotally connected at one end by the pin 31 to the lever 15 between the weighted element 22 and the pivot 16 and is pivotally connected at its opposite end by the pin 32 to the lever 25 at its bend.

From the foregoing it will be seen, that the weight of the end 21 of lever 15, element 22, end 26 of lever 25, and hook 28 is sufficient to normally hold the hooks 19 and 28 in the position as seen in Figure 1 which is the set position of the trap hook. Hook 19, which is smaller than the hook 28 is adapted to be baited to form the lure hook for attracting fish while the hook 28, which constitutes the gaff hook, is to be left unbaited. It will therefore be seen, that when a fish bites on the hook 19 the pull on the hook 19 which will be downwardly or away from the line 12 will swing the hook 28 upwardly to cause its barbed end to gaff the underside of the body of the fish, not shown, so that the fish will be effectively trapped and held between the two hooks and further pull on the hook 19 will tend to cause the hooks 19 and 28 to more effectively engage and hold the fish. As seen in Figure 2, the barbed end of the hook 28 extends beyond the barbed end of the hook 19 to enable it to engage the body of the fish even when the hook 19 is only slightly caught in the mouth.

Various modifications and changes in the precise construction and arrangement of the parts forming the invention are contemplated and may be resorted to and the right is reserved to make such variations as fall within the spirit and scope of the invention as hereinafter defined by the appended claims.

I claim as my invention:

1. A device of the class described comprising a supporting member having an enlarged end, a bar pivotally connected to one side of said enlarged end, the pivotal connection being nearer to one end of the bar than to the other end, the longer arm of said bar extending across said enlarged end, a hook secured to and projecting from the end of the shorter arm of said bar, a lever pivotally connected at one end to the opposite side of said enlarged end, the opposite end of said lever being angularly disposed relatively to the pivotally connected end, a hook connected to said angularly disposed end and projecting therefrom, and a link pivotally connecting said bar and lever.

2. A device of the class described comprising a supporting member having a bifurcated end, levers pivotally connected to the legs of said bifurcated end, portions of said levers being normally disposed in overlapping relationship, a link pivotally connecting said portions, and fish hooks projecting from corresponding ends of said levers.

3. A device as in claim 2, and the opposite end of one of said levers being provided with a weighted element for normally holding the hooks in a set position, substantially at right angles to each other.

4. A trap hook comprising a supporting member having a forked end, levers pivotally connected to the legs of said forked end, hooks secured to and projecting from corresponding ends of said levers, a weighted element secured to the opposite end of one of said levers, said lever being pivotally mounted intermediate of its ends, said other lever being angular in shape, and a link pivotally connecting said levers between the weighted element and the pivot point of the first mentioned lever and adjacent the pivot point of the last mentioned lever.

5. A trap hook comprising a supporting member, levers pivotally mounted in spaced apart relationship thereon, hooks projecting from corresponding ends of said levers and normally disposed at an angle to each other, and a link pivotally connected to each of said levers and disposed between said pivot points.

6. A device as in claim 5, one of said levers being pivotally mounted intermediate of its ends and being provided with a weighted element at its free end.

7. A trap hook comprising a support, levers pivotally connected thereto, hooks secured to and projecting from said levers, portions of said levers being disposed in overlapping relationship, and a link pivotally connected to the overlapping portions of said levers.

JULIUS A. COLE.